United States Patent
Hughes et al.

(10) Patent No.: US 7,670,152 B2
(45) Date of Patent: *Mar. 2, 2010

(54) DUAL INTERFACE SEPARABLE INSULATED CONNECTOR WITH OVERMOLDED FARADAY CAGE

(75) Inventors: David Charles Hughes, Rubicon, WI (US); Mark Clifford Kadow, Pewaukee, WI (US); Michael John Gebhard, Sr., Waukesha, WI (US)

(73) Assignee: Cooper Technologies Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/499,632

(22) Filed: Jul. 8, 2009

(65) Prior Publication Data

US 2009/0275223 A1 Nov. 5, 2009

Related U.S. Application Data

(63) Continuation of application No. 12/072,164, filed on Feb. 25, 2008, now Pat. No. 7,578,682.

(51) Int. Cl.
*H01R 4/58* (2006.01)
(52) U.S. Cl. .................................. 439/89; 439/921
(58) Field of Classification Search .................. 439/89, 439/921, 511, 606, 181, 604, 183–185, 137, 439/148
See application file for complete search history.

(56) References Cited

U.S. PATENT DOCUMENTS

| | | | | | |
|---|---|---|---|---|---|
| 1,903,956 | A | * | 4/1933 | Christie et al. ............... | 361/616 |
| 2,953,724 | A | * | 9/1960 | Hilfiker et al. ............... | 361/629 |
| 3,115,329 | A | * | 12/1963 | Wing et al. .................... | 251/31 |
| 3,315,132 | A | * | 4/1967 | Lucas ........................... | 361/829 |
| 3,392,363 | A | * | 7/1968 | Geis, Jr. et al. .............. | 439/357 |
| 3,471,669 | A | * | 10/1969 | Curtis ...................... | 200/302.1 |
| 3,474,386 | A | * | 10/1969 | Link ........................... | 439/181 |
| 3,509,516 | A | * | 4/1970 | Phillips ...................... | 439/184 |
| 3,509,518 | A | * | 4/1970 | Phillips ...................... | 439/281 |
| 3,513,425 | A | * | 5/1970 | Arndt .......................... | 337/201 |
| 3,539,972 | A | * | 11/1970 | Silva et al. ................... | 439/185 |
| 3,542,986 | A | * | 11/1970 | Kotski .......................... | 218/90 |
| 3,546,535 | A | * | 12/1970 | Van Riemsdijk ............. | 361/37 |
| 3,576,493 | A | * | 4/1971 | Tachick et al. ............... | 324/133 |
| 3,594,685 | A | * | 7/1971 | Cunningham ............... | 439/480 |
| 3,652,975 | A | * | 3/1972 | Keto ........................... | 439/184 |
| 3,654,590 | A | * | 4/1972 | Brown ......................... | 439/185 |
| 3,663,928 | A | * | 5/1972 | Keto et al. ................... | 439/184 |
| 3,835,439 | A | * | 9/1974 | Yonkers ....................... | 439/187 |

* cited by examiner

*Primary Examiner*—Neil Abrams
*Assistant Examiner*—Phuong Nguyen
(74) *Attorney, Agent, or Firm*—King & Spalding LLP

(57) ABSTRACT

A dual interface separable insulated connector comprising a faraday cage molded over a bus bar for use in an electric power system and a method of manufacturing the same are provided. The faraday cage can be disposed within a semi-conductive shell. The configuration of the separable insulated connector can provide for easier bonding between the faraday cage and insulating material. Additionally, the configuration can eliminate or reduce the need to coat the bus bar with an adhesive agent and to smooth the metal bus bar to remove burrs, other irregularities, and sharp corners from the bar. Manufacturing the dual interface separable insulated connector can include molding a semi-conductive rubber faraday cage over a conductive bus bar, inserting the faraday cage into a shell, and injecting insulating material between the faraday cage and shell.

20 Claims, 3 Drawing Sheets

DUAL INTERFACE SEPARABLE INSULATED CONNECTOR WITH OVERMOLDED FARADAY CAGE

RELATED PATENT APPLICATIONS

This patent application is a continuation of U.S. patent application Ser. No. 12/072,164, entitled "Dual Interface Separable Insulated Connector With Overmolded Faraday Cage," filed Feb. 25, 2008, now U.S. Pat. No. 7,578,682, which is related to co-pending U.S. patent application Ser. No. 12/072,498, entitled "Separable Connector with Reduced Surface Contact," filed Feb. 25, 2008; U.S. patent application Ser. No. 12/072,513, entitled "Push-Then-Pull Operation Of A Separable Connector System," filed Feb. 25, 2008; U.S. patent application Ser. No. 12/072,333, entitled "Separable Connector With Interface Undercut," filed Feb. 25, 2008; and U.S. patent application Ser. No. 12/072,193, entitled "Method Of Manufacturing A Dual Interface Separable Insulated Connector With Overmolded Faraday Cage," filed Feb. 25, 2008. The complete disclosure of each of the foregoing related applications is hereby fully incorporated herein by reference.

TECHNICAL FIELD

The invention relates generally to separable insulated connector systems for electric power systems. More specifically, the invention relates to a separable insulated connector having a molded faraday cage.

BACKGROUND

Separable insulated connectors provide an electric connection between components of an electric power system. More specifically, separable insulated connectors often connect sources of energy—such as cables carrying electricity generated by a power plant—to energy distribution systems or components thereof, such as switchgears and transformers. Other types of separable insulated connectors can connect to other separable insulated connectors on one or both of their ends.

Depending on the type and function of a separable insulated connector, the connector can include a variety of different interfaces. For example, many separable insulated connectors include two interfaces, one at each end of the connector. Some separable insulated connectors can include one male interface and one female interface, two male interfaces, or two female interfaces.

An exemplary connector with two female interfaces can, for example, include a bus bar—or conductive member that carries current—connecting the two female interfaces. Each female interface can include a "cup" through which one end of a probe can be inserted and then connected to the bus bar disposed within the separable insulated connector. The other end of the probe then can be connected to energy distribution components or other separable insulated connectors.

The cups are typically made from semi-conductive material and thus can serve as a faraday cage. As used throughout this application, a "semi-conductive" material can refer to rubber or any other type of material that carries current, and thus can include conductive materials. The purpose of a faraday cage is to shield all gaps of air within the mating components of the separable insulated connector, as these air gaps can cause corona discharge within the connector. This discharge can occur if there is a voltage drop across the air gaps, and the discharge can corrode the rubber materials often used to make the separable insulated connector. The faraday cage ensures that the various mating components have the same electric potential, and thus prevents corona discharge within the mating components.

Conventionally, the cups of such female-female separable insulated connectors are made from a rigid, conductive metal, such as copper. The cups, as well as the bus bar connecting them, are placed within a semi-conductive shell of the separable insulated connector. Conventional separable insulated connectors also can include various layers of insulating material—such as between the cups and the probes inserted therein, between the cups and the shell, and around the bus bar. The various layers of insulating material used in conventional separable insulated connectors can provide a barrier to shield the high voltage components from the exposed shell. Such a configuration can reduce or remove the risk of electric shock from touching the exterior of the separable insulated connectors.

This configuration of conventional separable insulated connectors has created several problems. Notably, it is difficult to bond the insulating material—which is generally made from a rubber such as ethylene propylene dienemonomer (EPDM) rubber, thermoplastic rubbers (TPRs), and/or silicone rubber—to the cups or the bus bar, both of which are generally made from metal. Rubber does not typically form a strong bond with metal. A strong bond between the insulating material and the metal cups and/or bus bar also is desirable because without a strong bond, air gaps can form between the metal and insulating materials. Corona or partial discharge can occur within the air gaps between the conductive metal and the semi-conductive rubber. The discharge can lead to severe damage of the insulating material and the connector. Manufacturers of conventional separable insulated connectors often coat the bus bar and/or cups with an adhesive to enhance the bond with the insulating material. However, in addition to creating an expensive extra step in the manufacturing process, these adhesives can be toxic and can cause environmental problems during storage, manufacturing, and disposal.

An additional problem created by the conventional configuration of such separable insulated connectors also stems from having insulating material bordering the bus bar. In such a configuration, the surfaces, edges, and corners of the bus bar must be smoothed and/or softened to remove any burrs, other irregularities, or sharp corners that may be present on the bar. Absent this step, such items on the bus bar can cause stress to or otherwise damage the insulating material that surrounds the bus bar, given the difference in electric potential between the bus bar and the insulating material, thereby causing damage to the entire separable insulated connector. Thus, manufacturers of conventional bus bars must perform the time consuming, labor-intensive, and expensive process of smoothing the bus bars prior to applying the insulating material.

Yet another problem with conventional separable insulated connectors is the tendency for conventional faraday cages to disconnect from the bus bar. The connection between conventional faraday cages and bus bars can become loosened during the manufacturing process, especially when insulating material is injected or otherwise inserted between the faraday cage and the shell. If the connection between the bus bar and the faraday cage is dropped, the faraday cage may no longer have the same electric potential as the bus bar, which therefore defeats the purpose of the faraday cage.

Thus, a need in the art exists for a separable insulated connector in an electric power system that addresses the disadvantages found in the prior art. Specifically, a need in the art exists for a dual interface separable insulated connector that does not require insulating material to bond to the bus bar. A need in the art also exists for a dual interface separable insulated connector with a faraday cage that can bond to insulating material without the use of an adhesive material, if desired. Yet another need in the art exists for a dual interface separable insulated connector with a faraday cage—and a method of manufacturing the same—where the connection between the faraday cage and bus bar is stronger and less likely to disconnect.

SUMMARY

The invention provides a dual interface separable insulated connector for use in an electric power system that includes a faraday cage that can bond to insulating material without the use of adhesive material. The invention also provides a dual interface separable insulated connector that can prevent the need to bond insulating material directly to a bus bar disposed therein. Specifically, the invention provides a separable insulated connector with a dual interface faraday cage made from a semi-conductive rubber material that can be molded over a bus bar providing a connection between conductive members inserted into the two interfaces of the faraday cage.

In one aspect, the invention provides a rubber faraday cage that overmolds a bus bar. The faraday cage can be made from a variety of different materials, including ethylene propylene dienemonomer (EPDM) rubber, thermoplastic rubbers (TPRs), and silicone rubber. The rubber used in manufacturing the faraday cage can be mixed with a conductive material, such as carbon black, thereby causing the faraday cage to be semi-conductive. Other suitable semi-conductive materials known to those having ordinary skill in the art and having the benefit of the present disclosure can be used instead of a semi-conductive rubber.

The faraday cage can include two interfaces for connecting to two probes. The probes then can be connected to other separable insulated connectors, switchgear, transformers, or other energy distribution components. A conductive member, such as a bus bar, can provide an electrical connection between the two probes inserted into the faraday cage, as is the practice with certain conventional separable insulated connectors utilizing faraday cages.

Unlike with conventional separable insulated connectors, however, the faraday cage can be molded over the bus bar, thereby avoiding many of the problems and difficulties associated with the prior art. Molding the semi-conductive faraday cage over the bus bar can eliminate the need for insulating material to bond to the metal bus bar. Instead, the semi-conductive material of the faraday cage can surround the bus bar, and then insulating material can bond to the semi-conductive material.

In such a configuration, the bus bar need not be smoothed or finished to remove burrs, other irregularities, or sharp corners. Because the bus bar can be bordered by a semi-conductive rubber faraday cage, the rubber faraday cage can have the same or similar electric potential as the bus bar, and thus any burrs present on the bar may not cause stress or damage to the rubber faraday cage. Furthermore, the surface of the rubber faraday cage can be smoothed much more easily than the metal bus bar before insulating material will be applied to the faraday cage. Thus, in such a configuration, the insulating material can contact a smooth, semi-conductive surface (i.e., the faraday cage) without the manufacturer having to engage in the lengthy and costly procedure of smoothing the metal bus bar.

Another advantage associated with eliminating the need for an insulating material to bond to the bus bar is the reduction or removal of the need to apply an adhesive agent to the bus bar. The rubber insulating material can bond to the rubber faraday cage much more easily than with the metal bus bar. For example, if the insulating material is applied to the faraday cage in a liquid state, bonding of the insulating material to the faraday cage can occur upon curing of the insulating material. Thus, a strong, tight bond (i.e., without air gaps) can be formed between the rubber faraday cage and the rubber insulating material without the use of a costly and potentially toxic adhesive agent. Although air gaps may exist between the bus bar and the faraday cage due to the comparatively poor bonding ability of rubber to metal, these air gaps do not pose a problem to the separable insulated connector because the faraday cage and bus bar have the same electric potential.

In another aspect, the invention provides a dual interface separable insulated connector that includes a semi-conductive outer shell with a faraday cage disposed therein, the faraday cage having two interfaces. As described previously, the faraday cage—including each of the two interfaces—can be made from a semi-conductive rubber material, such as EPDM, TPR, or silicone mixed with a conductive material such as carbon black.

The shell of the separable insulated connector can be made from the same material as the faraday cage. For example, the shell also can be made from a semi-conductive rubber material, such as EPDM, TPR, or silicone mixed with a conductive material such as carbon black. The separable insulated connector also can include an insulating layer, as described previously, between the faraday cage and the shell.

The use of a semi-conductive material to form the interfaces or "cups" can eliminate the need to use an adhesive agent in bonding insulating material to the faraday cage interfaces. Because the faraday cage—including the interfaces—can be made from a rubber material rather than a metal such as copper, the insulating material can bond to the interfaces much more easily, as described previously with respect to the bus bar. The use of a semi-conductive material to form the faraday cage interfaces allows the faraday cage to maintain the ability—associated with conventional faraday cages—to prevent corona discharge.

The interfaces of the dual interface separable insulated connector can be configured such that a probe can be inserted into each of the interfaces. When combined with a bus bar providing an electric connection between the two interfaces, the dual interface separable insulated connector can provide an electric connection between the two probes inserted therein. Thus, upon connection of the two probes to a first energy distribution component and second energy distribution component, respectively, the separable insulated connector can provide an electric connection between the two energy distribution components.

In yet another aspect, the invention provides a method of manufacturing a dual interface separable insulated connector that includes a semi-conductive outer shell with a faraday cage disposed therein. A manufacturer can inject a semi-conductive rubber material into a mold or press to form the semi-conductive shell. The shell then can be cured and/or hardened.

Then, the manufacturer can take a conductive member or bus bar and put it into a mold or press in the shape of the dual interface faraday cage. Two steel mandrels also can be inserted into the mold to provide the holes or openings that will form the two interfaces of the faraday cage. The manufacturer then can inject a semi-conductive rubber material into the mold to form the faraday cage. The faraday cage—with the bus bar being disposed therein—then can be cured and/or hardened.

The faraday cage then can be inserted into the shell. To fit the faraday cage into the shell, the shell may need to be cut or split, manufactured to include such a cut or split therein, or formed into two separate pieces during the molding process. Once the faraday cage has been inserted into the shell, the shell can be made (or remade) into one piece. Then, insulating material can be injected into the shell, thereby providing a layer of insulating material between the faraday cage and the shell. The insulating material then can be cured and/or hardened, thereby securing the faraday cage within the shell.

These and other aspects, objects, features, and embodiments of the invention will become apparent to a person of ordinary skill in the art upon consideration of the following detailed description of illustrative embodiments, which include the best mode for carrying out the invention as presently perceived.

DETAILED DESCRIPTION OF EXEMPLARY EMBODIMENTS

The following description of exemplary embodiments refers to the attached drawings, in which like numerals indicate like elements throughout the figures.

Figure 1:
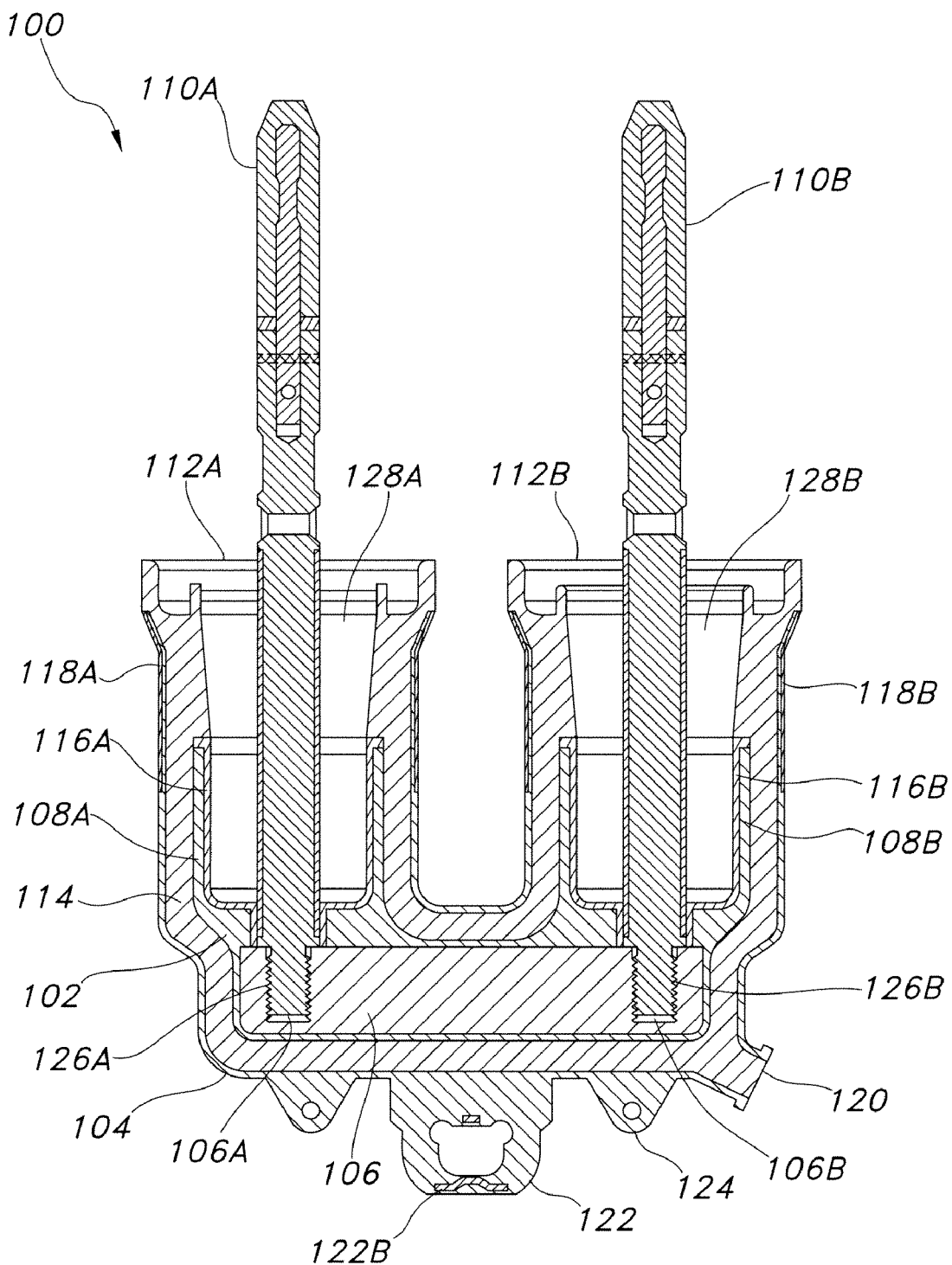
FIG. 1 is a cross-sectional side view of a dual interface separable insulated connector comprising a faraday cage molded over a bus bar, according to an exemplary embodiment.

FIG. 1 is a cross-sectional side view of a dual interface separable insulated connector 100 comprising a faraday cage 102 molded over a bus bar 106, according to an exemplary embodiment. The dual interface connector 100 includes a shell 104, a faraday cage 102 disposed therein, and a bus bar 106 disposed within the faraday cage 102. In the illustrated embodiment, the dual interface connector 100 includes a first opening 112A and second opening 112B, and probes 110A, 110B is inserted into each of the first and second openings 112A, 112B, respectively. In an exemplary embodiment, the faraday cage 102 can include a first cup 108A and a second cup 108B, corresponding with the shell's 104 first and second openings 112A, 112B, respectively. In another an exemplary embodiment, the first and second probes 110A, 110B can be inserted through the first and second openings 112A, 112B and through the first and second cups 108A, 108B, and then attached to the bus bar 106, thereby providing a connection from the first probe 110A to the second probe 110B. In another exemplary embodiment, the dual interface connector 100 also can include a layer 114 of insulating material between the faraday cage 102 and the shell 104. As shown in FIG. 1, in exemplary embodiments, both the shell 104 and the faraday cage 102 disposed therein can have a substantially "U" shape.

The shell 104 of the dual interface connector 100 can be made from a variety of materials. In exemplary embodiments, the shell 104 can be made from semi-conductive rubber. Examples of suitable rubbers include ethylene propylene dienemonomer (EPDM) rubber, thermoplastic rubbers (TPRs), and silicone rubber. Any of these rubbers then can be mixed with a conductive material, such as carbon black or other suitable material, thereby providing the semi-conductive property for the shell 104.

Similarly, the faraday cage 102 of the dual interface connector 100 can be made from a variety of materials. In an exemplary embodiment, the faraday cage 102 can be made from the same material used to make the shell 104. For example, the faraday cage 102 can be made from semi-conductive rubber, such as a mixture of a conductive material and EPDM rubber, TPRs, or silicone rubber.

The layer 114 of insulating material between the shell 104 and the faraday cage 102 also can be made from a variety of materials. In various exemplary embodiments, the insulating material can be made from any suitable non-conductive material, known to those having ordinary skill in the art and having the benefit of the present disclosure. In particular exemplary embodiments, the insulating material can be made from EPDM rubber, TPRs, or silicone rubber, but without being mixed with a significant amount of conductive material, thereby retaining an insulating property.

In an exemplary embodiment, the dual interface connector 100 also can include other insulating layers. For example, the faraday cage 102 can include an additional insulating layer 116A, 116B on the first and second cups 108A, 108B inside the faraday cage 102. In one embodiment, these cup insulating layers 116A, 116B can be made from the same material used in the insulating layer 114 between the shell 104 and faraday cage 102. In an alternative exemplary embodiment, the cup insulating layers 116A, 116B can be made from a different insulating material. Particular exemplary types of insulating materials that can be used to form the cup insulating layers 116A, 116B are disclosed in U.S. Pat. No. 5,655,921 to Makal et al., the complete disclosure of which is hereby fully incorporated herein by reference. As shown in FIG. 1, the cup insulating layers 116A, 116B can be relatively thin when compared to the insulating layer 114 between the shell 104 and faraday cage 102.

In other exemplary embodiments, the shell 104 of the dual interface connector 100 also can include additional insulating layers. For example, as shown in FIG. 1, the shell 104 can include two insulating sleeves 118A, 118B, each one located near the first and second openings 112A, 112B of the shell 104. As with the cup insulating layers 116A, 116B described previously, the insulating sleeves 118A, 118B can be made from the same material used in the insulating layer 114 between the shell 104 and faraday cage 102, or alternatively, from a different suitable material.

In exemplary embodiments, the additional insulating layers such as the cup insulating layers 116A, 116B and the insulating sleeves 118A, 118B can provide additional insulation for the dual interface connector 100. The cup insulating layers 116A, 116B can provide load-break switching for the dual interface connector 100. Additionally, the cup insulating layers 116A, 116B can protect against partial vacuum flashover which could cause the connector 100 to be pulled off of a bushing connected thereto. The insulating sleeves 118A, 118B can prevent a switching failure made when separating a probe 110A, 110B from the connector 100. Absent the insulating sleeves 118A, 118B, a probe 110A, 110B may contact the semi-conductive shell 104, thereby causing a switching failure.

In various exemplary embodiments, the shell 104 of the dual interface connector 100 also can comprise a variety of additional components. For example, as shown in FIG. 1, the shell 104 of the dual interface connector 100 also can include a pulling eye 122. The pulling eye 122 can function as a handle for the dual interface connector 100. The pulling eye 122 can be pulled or pushed to install the dual interface connector 100 on an energy distribution component, to adjust the position of the dual interface connector 100, or to disconnect the dual interface connector 100 from an energy distribution component. In one exemplary embodiment, the pulling eye 122 can be made from the same material used to make the shell 104, such as EPDM rubber or another type of rubber. In a particular exemplary embodiment, the pulling eye 122 can include a steel insert 122b, disposed within the rubber, providing strength and resilience to the pulling eye 122.

In another exemplary embodiment, the shell 104 of the dual interface connector 100 also can include an injection port 120, through which insulating material can be injected. In yet another exemplary embodiment, the shell 104 can include one or more ground wire tabs 124 to which a wire can be attached and grounded. Because the shell 104 can be made from semi-conductive rubber, the ground wire can provide ground shield continuity for the dual interface connector 100, thereby providing deadfront safety for the shell 104. In other words, the grounded shell 104 can allow operators to touch the exterior of the dual interface connector 100 safely, thereby removing or reducing the risk of accidental electric shock.

In an exemplary embodiment, the first and second probes 110A, 110B can be made from a variety of conductive materials, such as conductive metals known to those having ordinary skill in the art and having the benefit of the present disclosure. In one exemplary embodiment, the probes 110A, 110B can be made from conductive copper. In a particular exemplary embodiment, the probes 110A, 110B can include a threaded end 126A, 126B for connection to the bus bar 106.

The bus bar 106 can be made from a variety of conductive materials, such as conductive copper or other metals. Regardless of the particular material used, the bus bar 106 can include two holes 106A, 106B, into which the first and second probes 110A, 110B can be inserted and affixed. In a particular exemplary embodiment, the threaded ends 126A, 126B of the probes 110A, 110B can be screwed into corresponding threads in the holes 106a, 106b of the bus bar 106. The conductive property of the bus bar 106 can carry load current, and thus can provide an electric connection between the first and second probes 110A, 110B.

In an exemplary embodiment, the faraday cage 102 can be molded over the bus bar 106, such that entire bus bar 106 is disposed within the faraday cage 102. Because the bus bar 106 can be overmolded with the faraday cage 102, the bus bar 106 need not be polished, refined, or smoothed to remove any burrs on the bus bar 106. Instead, in an exemplary embodiment, the rubber faraday cage 102 can be molded into a smooth, curved shape, which can take less effort than removing burrs from a metal bus bar 106.

Additionally, because the faraday cage 102 can be made from a semi-conductive material, it can have the same or similar electric potential as the bus bar 106. Therefore, any air gaps that may be present between the faraday cage 102 and the bus bar 106 may not cause corona discharge.

In an exemplary embodiment, as described previously, and as shown in FIG. 1, the insulating layer 114 can border the faraday cage 102. The bond between the faraday cage 102 and the insulating layer 114 can be tighter than the bond between the faraday cage 102 and the bus bar 106. In other words, there may be few air gaps, if any, between the faraday cage 102 and the insulating layer 114, which can reduce or eliminate the possibility of corona discharge between two layers 102, 114 having a different electric potential. In exemplary embodiments, such a tight bond can be formed relatively easily because both the faraday cage 102 and the insulating layer 114 can be primarily made of rubber materials that bond to each other easily.

In another exemplary embodiment, as shown in FIG. 1, the first and second cups 108A, 108B of the faraday cage 102 can contact the insulating layer 114 on the outer side of the cups 108A, 108B. Unlike with conventional cup-shaped faraday cages that can be made from conductive metal, the first and second cups 108A, 108B of the faraday cage 102 also can bond easily with the insulating material because the cups and the insulating material can be made from rubber.

In another exemplary embodiment, the inner side of the cups 108A, 108B can contact the cup insulating layers 116A, 116B, as described previously. In yet another exemplary embodiment, an empty space 128A, 128B can exist in the area inside the cup insulating layers 116A, 116B. These empty spaces 128A, 128B can be configured such that bushings capable of interfacing with the probes 110A, 110B can be inserted and secured therein. In a particular exemplary embodiment, such bushings can be part of—or can be connected to—another separable insulated connector or an energy distribution component.

The faraday cage 102 comprises the cups 108A, 108B and the portions that extend around the bus bar 106.

Figure 2:
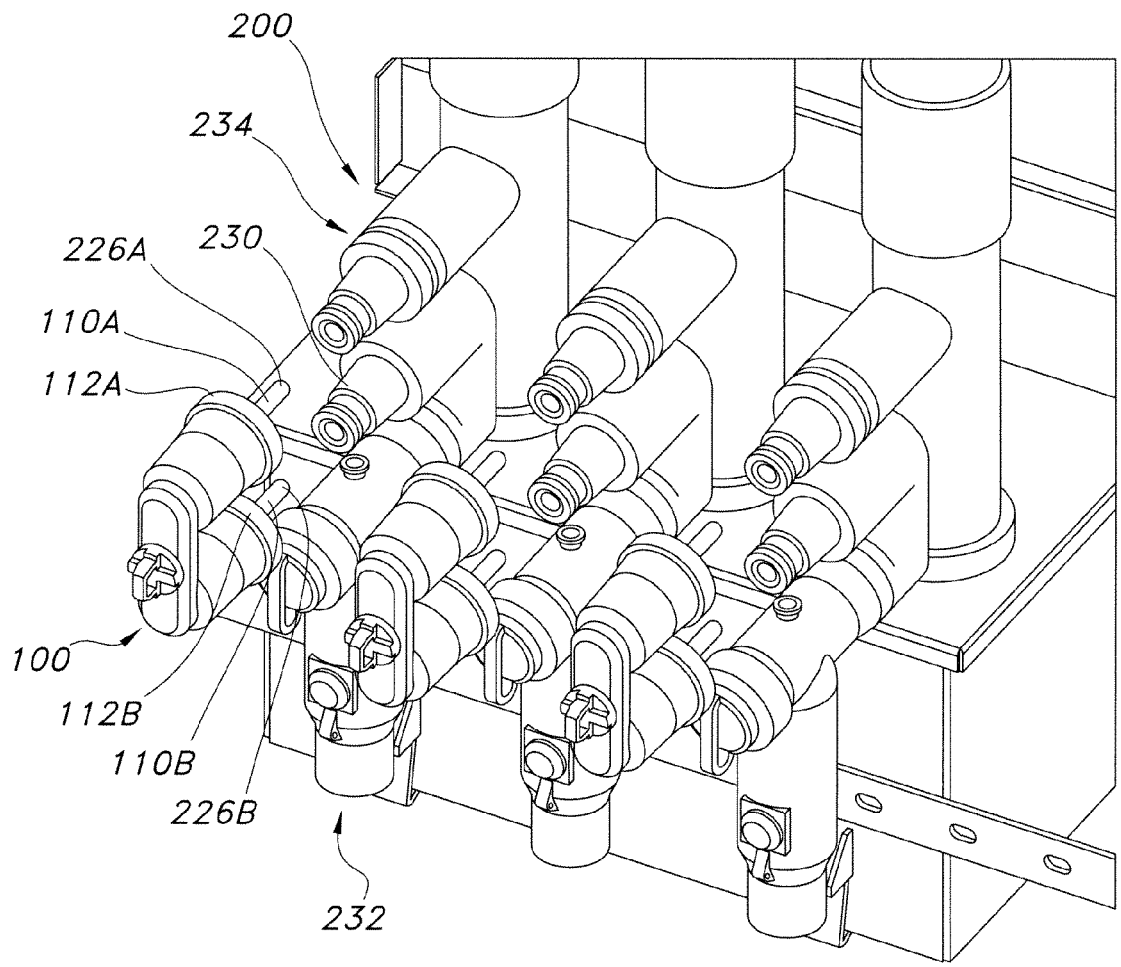
FIG. 2 is a diagram illustrating an electric power system utilizing a dual interface separable insulated connector comprising a faraday cage molded over a bus bar, according to an exemplary embodiment.

FIG. 2 is a diagram illustrating an electric power system 200 utilizing a dual interface separable insulated connector 100 that comprises a faraday cage 102 molded over a bus bar 106, according to an exemplary embodiment. In an exemplary embodiment, one end 126A of a first probe 110A can be inserted into the first opening 112A of the dual interface separable insulated connector 100, the first cup 108A, and the first hole 106A of the bus bar 106, and the other end 226A of the first probe 110A can be inserted into a bushing 230 that connects to another separable insulated connector such as a T-body connector 232. Additionally, one end 126B of a second probe 110B can be inserted into the second opening 112B of the dual interface separable insulated connector 100, the second cup 108B, and the second hole 106B of the bus bar 106, and the other end 226B of the second probe 110B can be inserted into an energy distribution component 234. In such an embodiment, the dual interface separable insulated connector 100 can provide an electric connection between the T-body connector 232 and the energy distribution component 234.

In an alternative embodiment, the dual interface separable insulated connector 100 can connect to the other separable insulated connector without first connecting to a bushing 230 as shown in FIG. 2. In another alternative embodiment, the dual interface separable insulated connector 100 can connect two separable insulated connectors together, rather than connecting to an energy distribution component 234. The dual interface separable insulated connector 100 can connect to a variety of other separable insulated connectors and/or energy distribution components 234 using a variety of configurations, known to those having ordinary skill in the art and having the benefit of the present disclosure.

Figure 3:
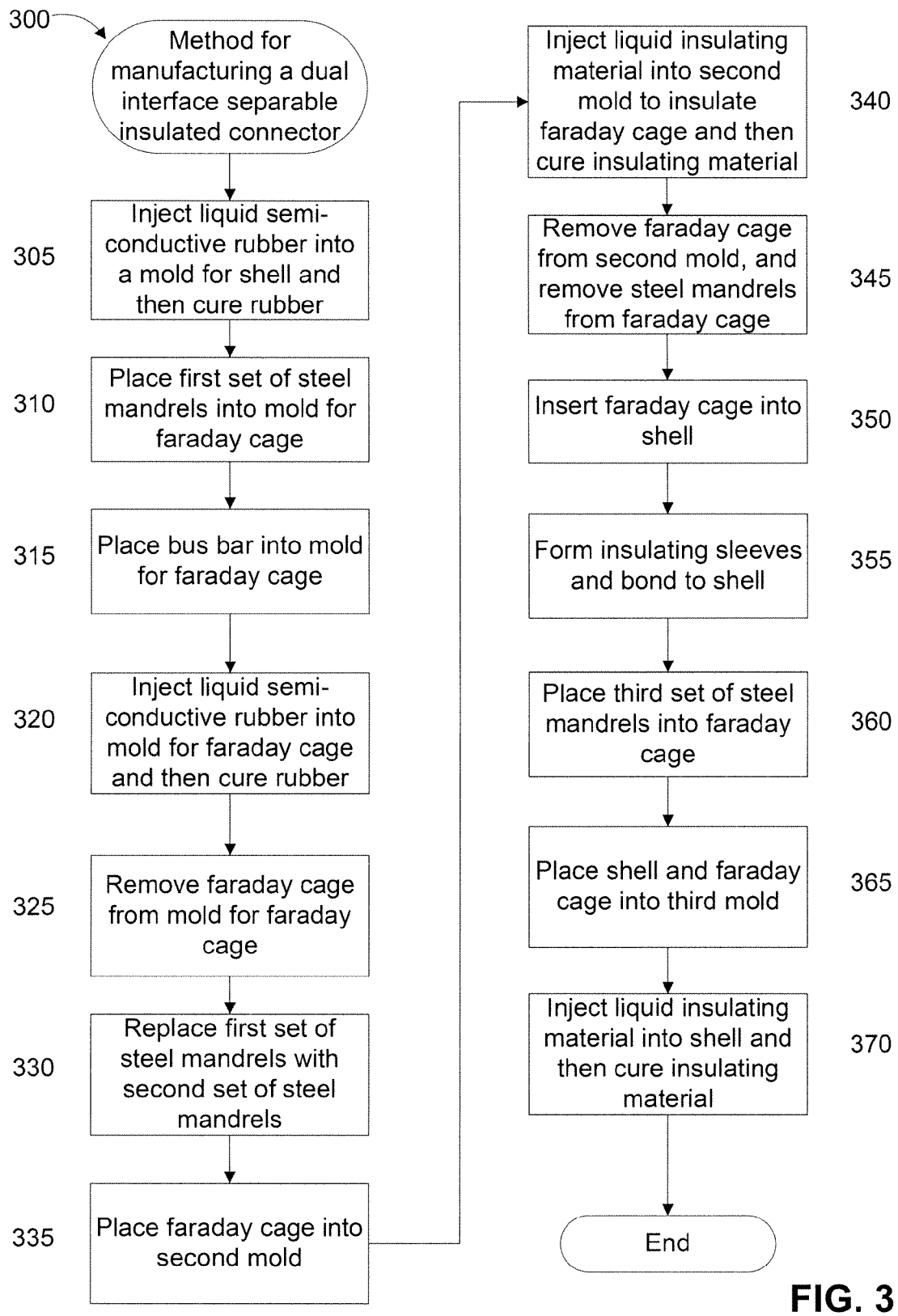
FIG. 3 is a flow diagram illustrating an exemplary method for manufacturing a dual interface separable insulated connector comprising a faraday cage molded over a bus bar.

FIG. 3 is a flow diagram illustrating a method 300 for manufacturing a dual interface separable insulated connector 100 comprising a faraday cage 102 molded over a bus bar 106 according to an exemplary embodiment. The method 300 will be described with reference to FIGS. 1 and 3.

In step 305, liquid semi-conductive rubber is injected into a mold for the shell 104 and then cured until the rubber has cured or solidified. Any of the various exemplary semi-conductive rubbers described previously, such as EPDM rubber, TPRs, or silicone rubber can be used.

In an exemplary embodiment, the size, shape, dimension, and configuration of the mold can be selected based upon the desired size, shape, dimension, and configuration of the shell 104 of the dual interface separable insulated connector 100. In another exemplary embodiment, the mold can be shaped to include one or more ground wire tabs 124 and/or a pulling eye 122. Additionally, if the mold is shaped to include a pulling eye 122 on the shell 104, a metal insert can be placed in the mold, approximately the size and shape of the pulling eye 122, such that the insert can be disposed within the pulling eye 122. As described previously, the insert can provide additional strength for the pulling eye 122.

In step 310, a first set of steel mandrels is placed into a mold for the faraday cage 102. In an exemplary embodiment, two steel mandrels can be placed into the mold for the faraday cage 102, and can have a size corresponding with the first and second cups 108A, 108B. In another exemplary embodiment, the width of the first set of steel mandrels can be wider than the desired width for the first and second cups 108A, 108B, to account for the cup insulating layers 116A, 116B that may be formed. The first set of steel mandrels can be inserted into the holes 106A, 106B of the bus bar 106. For example, the first set of steel mandrels can be screwed into the threads in the holes 106A, 106B of the bus bar 106. Additionally, as described previously with respect to the shell 104, the dimensions of the mold can be selected based upon the desired dimensions of the faraday cage 102.

In step 315, the bus bar 106 is placed into the mold for the faraday cage 102 of the dual interface separable insulated connector 100. Optionally, the bus bar 106 can be coated with an adhesive agent. Although an adhesive agent may not be necessary, as the bond between the bus bar 106 and the faraday cage 102 can include air gaps as described previously, an adhesive agent may be utilized if a stronger bond is desired. Such a bond may be desired to prevent any warping or tearing of the faraday cage 102, insulating material, or shell 104 upon adjusting of the dual interface separable insulated connector 100, such as by pulling on the pulling eye 122.

In another exemplary embodiment, first and second holes 106A, 106B can be created in the bus bar 106, such that first and second probes 110A, 110B can be inserted and attached therein. In another exemplary embodiment, the holes 106A, 106B can be threaded so as to correspond with threaded ends 126A, 126B of the first and second probes 110A, 110B.

In step 320, liquid semi-conductive rubber is injected into the mold for the faraday cage 102. Any of the various exemplary semi-conductive rubbers described previously, such as EPDM rubber, TPRs, or silicone rubber can be used. The semi-conductive rubber then can be cured until it has cured and hardened.

In step 325, the faraday cage 102 is removed from the mold for the faraday cage 102.

In step 330, the first set of steel mandrels is replaced with a second set of steel mandrels. In an exemplary embodiment, the second set of steel mandrels are narrower than the first set. In another exemplary embodiment, the second set of steel mandrels can have a width substantially equal to the desired width of the first and second cups 108A, 108B. The second set of steel mandrels can be inserted into the holes 106A, 106B of the bus bar 106. For example, the second set of steel mandrels can be screwed into the threads in the holes 106A, 106B of the bus bar 106. In an alternative embodiment, a second set of steel mandrels might not be used, and instead, the hole created by the removal of the first set of steel mandrels may be left open for the remainder of the manufacturing process. For example, if the faraday cage 102 will not include cup insulating layers 116A, 116B, then a second set of steel mandrels may not need to be inserted into the faraday cage 102 after removal of the first set of steel mandrels.

In step 335, the faraday cage 102 is placed into a second mold. The second mold for the faraday cage 102 can be larger in dimension than the first mold, and can be configured to form the cup insulating layers 116A, 116B of the faraday cage 102 upon the injection of insulating material into the second mold.

In step 340, liquid insulating material is injected into the second mold to insulate the faraday cage 102 and then cured to form the cup insulating layers 116A, 116B. As described previously, a variety of rubber materials—such as EPDM rubber, TPRs, or silicone rubber—can be used to form the cup insulating layers 116A, 116B. The insulating material then can be cured until it has cured and hardened.

In step 345, the faraday cage 102 is removed from the second mold, and the second set of steel mandrels is removed from the faraday cage 102.

In step 350, the faraday cage 102 is inserted into the shell 104. In an exemplary embodiment, the shell 104 can be cut or split—or alternatively, the shell 104 could have been formed in step 305 to include a cut or split therein—to provide additional flexibility such that the faraday cage 102 can be inserted therein. In an alternative exemplary embodiment, the shell 104, when formed in step 305, can be formed in two separate pieces, thereby providing additional flexibility and a larger opening into which the faraday cage 102 can be inserted. After the faraday cage 102 has been inserted into the shell 104, the splits or pieces of the shell 104 can be attached (or reattached) together, thereby enclosing the faraday cage 102 within the shell 104.

In step 355, the insulating sleeves 118A, 1118B are formed and bonded to the shell 104 of the dual interface separable insulated connector 100. In an exemplary embodiment, the insulating sleeves 118A, 118B can be formed by injecting suitable insulating material into a mold for the insulating sleeves 118A, 118B. In another exemplary embodiment, the insulating sleeves 118A, 118B then can be bonded to the shell 104 of the dual interface separable insulated connector 100 by using an adhesive. Alternatively, the insulating sleeves 118A, 118B can be attached to the shell 104 before the insulating sleeves 118A, 118B has completely cured, and thus it can bond to the shell 104 upon curing of the insulating sleeves 118A, 118B.

In step 360, a third set of steel mandrels is inserted into the faraday cage 102. This third set replaces the second set of steel mandrels removed in step 345. In an exemplary embodiment, the third set of steel mandrels can be more narrow than the second set. In an alternative embodiment, instead of replacing the second set of steel mandrels, the hole created by the removal of the steel mandrels may be left open for the remainder of the manufacturing process. In an exemplary embodiment, if a third set of steel mandrels replaced the second set of steel mandrels, then the faraday cage 102 can be inserted into the shell 104 with the third set of steel mandrels inserted therein. In various exemplary embodiments utilizing a third set of steel mandrels, the third set of steel mandrels can be inserted into the faraday cage 102 at different stages of the manufacturing process. For example, the third set of steel mandrels can be inserted into the faraday cage 102 during or after steps 345, 350, or 355, or at any other time during the manufacturing process.

In step 365, the shell 104 and faraday cage 102 are placed into a third mold. In an exemplary embodiment, the third mold can be configured to form the insulating layer 114 upon injection of insulating material into the third mold.

In step 370, insulating material is injected into the shell 104 and then cured. In an exemplary embodiment, the insulating material injected in step 345 can form the insulating layer 114 between the shell 104 and faraday cage 102. In another exemplary embodiment, the insulating material can be injected through the injection port 120. In a particular embodiment, the injection port 120 can be opened before injection and closed thereafter. As described previously, a variety of rubber materials—such as EPDM rubber, TPRs, or silicone rubber—can be used to form the insulating layer 114. The insulating material then can be cured until it has cured and hardened.

In an exemplary embodiment, the third set of steel mandrels (if present) in the faraday cage 102 can be removed from the faraday cage 102. In an exemplary embodiment, the first and second probes 110A, 110B can be inserted into the first and second holes in the bus bar 106 after the third set of steel mandrels has been removed from the faraday cage 102. At this point, the dual interface separable insulated connector 100 can have substantially the same form as the exemplary dual interface separable insulated connector 100 shown in FIG. 1.

Many other modifications, features, and embodiments will become evident to a person of ordinary skill in the art having the benefit of the present disclosure. It should be appreciated, therefore, that many aspects of the invention were described above by way of example only and are not intended as required or essential elements of the invention unless explicitly stated otherwise. It should also be understood that the invention is not restricted to the illustrated embodiments and that various modifications can be made within the spirit and scope of the following claims.

What is claimed is:

1. A faraday cage for a separable insulated connector, comprising:
   a semi-conductive rubber housing; and
   a conductive bus bar in contact with the semi-conductive rubber housing;
   a first cup defined by the rubber housing and disposed on the bus bar; and a second cup defined by the rubber housing and disposed on the bus bar;
   a first cup insulating layer disposed within the first cup; and a second cup insulating layer disposed within the second cup;
   wherein the conductive bus bar is entirely disposed within the semi-conductive rubber housing.

2. The faraday cage of claim 1, wherein the rubber housing comprises a mixture comprising ethylene propylene dienemonomer rubber and a conductive material.

3. The faraday cage of claim 1, wherein the bus bar comprises a first hole and a second hole,
   wherein the first hole is aligned with the first cup and is configured to secure a first probe inserted therein, and
   wherein the second hole is aligned with the second cup is configured to secure a second probe inserted therein.

4. The faraday cage of claim 1, wherein the faraday cage is disposed within a separable insulated connector.

5. The faraday cage of claim 1, wherein the separable insulated connector comprises a dual interface separable insulated connector.

6. The faraday cage of claim 1, wherein the bus bar comprises: a first hole; and a second hole, and wherein the faraday cage further comprises:
   a first probe inserted into the first hole; and
   a second probe inserted into the second hole,
   wherein an electrical connection exists between the first probe and the second probe.

7. The faraday cage of claim 6, wherein the bus bar provides the electrical connection between the first probe and the second probe.

8. A separable insulated connector, comprising:
   a shell;
   a faraday cage disposed within the shell; and
   a conductive bus bar entirely disposed within the faraday cage,
   a first cup defined by the rubber housing and disposed on the bus bar; and a second cup defined by the rubber housing and disposed on the bus bar;
   a first cup insulating layer disposed within the first cup; and a second cup insulating layer disposed within the second cup;
   wherein the faraday cage comprises a semi-conductive rubber housing.

9. The separable insulated connector of claim 8, wherein the shell comprises semi-conductive rubber.

10. The separable insulated connector of claim 8, wherein the shell comprises a mixture comprising ethylene propylene dienemonomer rubber and a conductive material.

11. The separable insulated connector of claim 8, further comprising a pulling eye.

12. The separable insulated connector of claim 8, wherein the conductive bus bar is in contact with the semi-conductive rubber housing.

13. The separable insulated connector of claim 8, further comprising:
    a first insulating sleeve; and
    a second insulating sleeve,
    wherein the shell comprises a first opening and a second opening, wherein the first insulating sleeve is disposed around the first opening, and wherein the second insulating sleeve is disposed around the second opening.

14. The separable insulated connector of claim 13, wherein the first insulating sleeve comprises rubber, and
    wherein the second insulating sleeve comprises rubber.

15. The separable insulated connector of claim 14, wherein the first insulating sleeve comprises ethylene propylene dienemonomer rubber, and
    wherein the second insulating sleeve comprises ethylene propylene dienemonomer rubber.

16. The separable insulated connector of claim 8, further comprising an insulating layer between the shell and the faraday cage.

17. The separable insulated connector of claim 16, wherein the insulating layer comprises rubber.

18. The separable insulated connector of claim 16, wherein the insulating layer comprises ethylene propylene dienemonomer rubber.

19. A separable insulated connector, comprising:
    a shell;
    a faraday cage disposed within the shell; and
    a conductive bus bar entirely disposed within the faraday cage,
    wherein the shell comprises a first opening and a second opening,
    wherein the faraday cage comprises a semi-conductive rubber housing, the semi-conductive rubber housing comprising a first cup arid a second cup,
    a first cup insulating layer disposed within the first cup; and a second cup insulating layer disposed within the second cup;
    wherein the first opening is aligned with the first cup, and wherein the second opening is aligned with the second cup.

20. The separable insulated connector of claim 19, wherein the conductive bus bar is in contact with the semi-conductive rubber housing.

* * * * *